Figure 1:
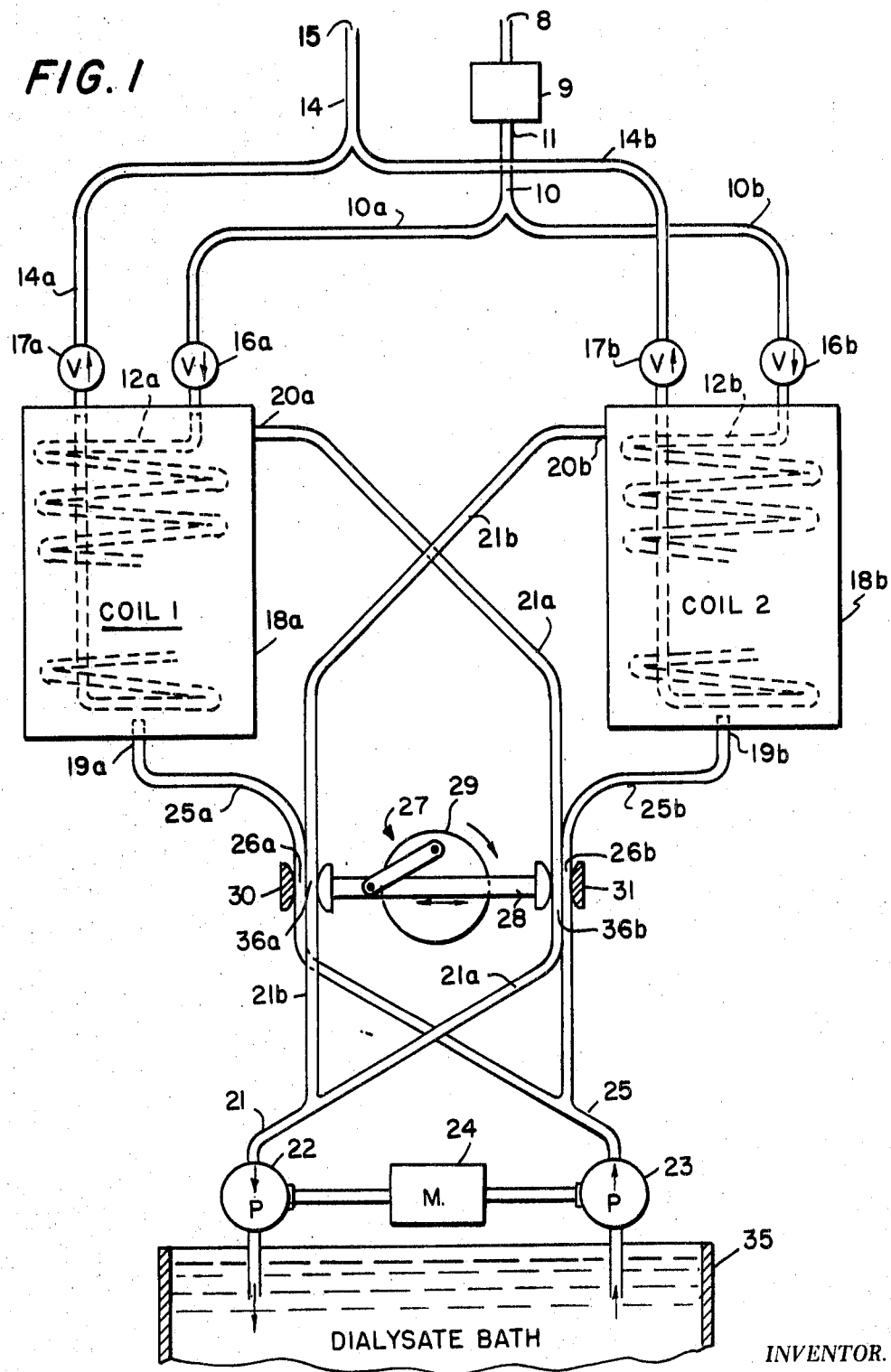

United States Patent

[11] 3,570,672

| [72] | Inventor | Bert Bach |
| | | 270 West End Ave., New York, N.Y. 10023 |
| [21] | Appl. No. | 853,684 |
| [22] | Filed | Aug. 28, 1969 |
| [45] | Patented | Mar. 16, 1971 |

[54] ARTIFICIAL KIDNEY
7 Claims, 2 Drawing Figs.

[52] U.S. Cl...................................................... 210/110,
210/117, 210/134, 210/136, 210/139, 210/321,
210/351, 210/416
[51] Int. Cl.......................................................B01d 31/00,
B01d 13/00
[50] Field of Search.......................................... 210/321,
22, 23, 19, 138, 139, 140, 351, 98, 110, 117, 134,
136, 416

[56] References Cited
UNITED STATES PATENTS

| 3,370,710 | 2/1968 | Bluemle, Jr.................. | 210/321 |
| 3,479,280 | 11/1969 | Boissevain................... | 210/321X |

*Primary Examiner*—Frank A. Spear, Jr.
*Attorney*—Eliot S. Gerber

ABSTRACT: An artificial kidney is adapted to circulate a patient's blood, outside of his body, through a membrane container. Inside of a fluidtight container, the exterior wall of the membrane is washed with a circulating washing liquid. A timing device and a pressure mechanism alternately raise and lower the pressure of the washing liquid within the fluidtight container. A plurality of one-way valves, in series with the membrane container, cooperate with the pressure changes on the membrane and effect a pumping action on the blood.

ARTIFICIAL KIDNEY

The present invention relates to medical devices and more particularly to an artificial kidney.

For some years patients who have suffered from kidney damage have been able to lead useful and productive lives because of the availability of artificial kidney devices. Such devices are external to the body and are connected, periodically, to the blood circulation system of the patient. The patient, usually through tubes which remain attached to one of his veins and arteries, is connected, for example, two to three times weekly, to the machine. His blood flows through the machine and is cleaned of impurities, i.e., hemodialyses.

At the present time, pervious are two types of artificial kidney machines in widespread use. One type uses a blood pump to force the blood through a long membrane tube. The membrane is surrounded by a washing (rinse) fluid, i.e., the dialysate liquid, which is circulated outside of the membrane. This membrane tube is wound in a coil with plastic mesh, which permits the dialysate to flow across all the tubular membrane surface. The membrane is pervious to impurities (permits their diffusion through the membrane) but retains the blood. This device permits a rapid cleansing of the blood. However, it presents a number of disadvantages. The blood, in its passage through the pump, may be crushed, possibly causing damage to the blood cells (hemolysis) and leading to clotting. The pump may have to be primed with donor blood, which may be difficult to obtain, costly, and present the possibility of disease transfer and a reaction by the patient.

A second, and in a sense more gentle, method is to permit the natural heart pumped flow of blood to circulate the blood through the device, i.e., the pressure difference between arterial and venous blood. This type of device may use a sandwich construction in which sheets of a membrane are held in a frame, the blood circulated between the membranes, and their outer surfaces bathed with a circulated rinsing solution. However, the natural blood pressure (difference artery-vein) is not sufficiently high to provide a rapid flow of the blood. Consequently, the process is prolonged, for example, it may take 8 or 10 hours. This prolonged treatment engages scarce hospital personnel and equipment may be costly although the membranes themselves are inexpensive, and may be uncomfortable and inconvenient for the patient. It may make it difficult for the patient to lead a normal life.

It is the objective of the present invention to provide an artificial kidney which enables the blood to be cleansed relatively rapidly, which does not require the use of donor blood, which does not injure the blood or cause its clotting, and which requires the minimum time of hospital personnel and equipment.

In accordance with the present invention, an artificial kidney is provided. An input tube to the kidney is adapted to be connected to a tube branching from the patient's artery. The output tube of the kidney is adapted to be connected to a tube branching from the patient's vein. The inlet tube leads to a tube of a thin suitable dialysis membrane material, for example, wound about a cylinder in the form of a helical spiral. The cylinder is within a fluidtight drum. An entrance and an exit port of the drum are connected to a tube leading to a pump. The pump flows washing fluid through the drum. The drum is continually full of washing fluid. At a programmed rate, the pump raises the pressure and lowers the pressure of the washing fluid. This rising and falling pressure causes a gradual and gentle contraction and expansion of the thin flexible membrane. A series of one-way valves, in the blood lines, causes the contraction and expansion of the membrane to provide a pumping action of the blood. The one-way valves also prevent back flow of the blood.

In one embodiment there are provided two drums, each of which has ports for the washing fluid and each of which has therein a helical spiral of a thin flexible dialysis membrane tube. A suitable arrangement of one-way valves in the blood-filled tubes, and suitable one-way valves in the tubes for the washing fluid, and an exactly controlled pumping provides an almost constant pumping of the blood, which is, in effect, a push-pull arrangement between the two drums. In another embodiment the helical spiral membrane is replaced by a flat flexible sheet membrane, for example, of 300 gauge cellophane or cast strained polytetrafluoroethylene film held in a sandwich construction. The blood flows between membranes which are washed by washing fluid. A pump alternately raises and lowers the pressure of the washing fluid, causing a slowing pulsating motion of the membranes. A series of one-way valves in the lines carrying blood causes the pulsating membrane motion to pump the patient's blood.

Figure 2:
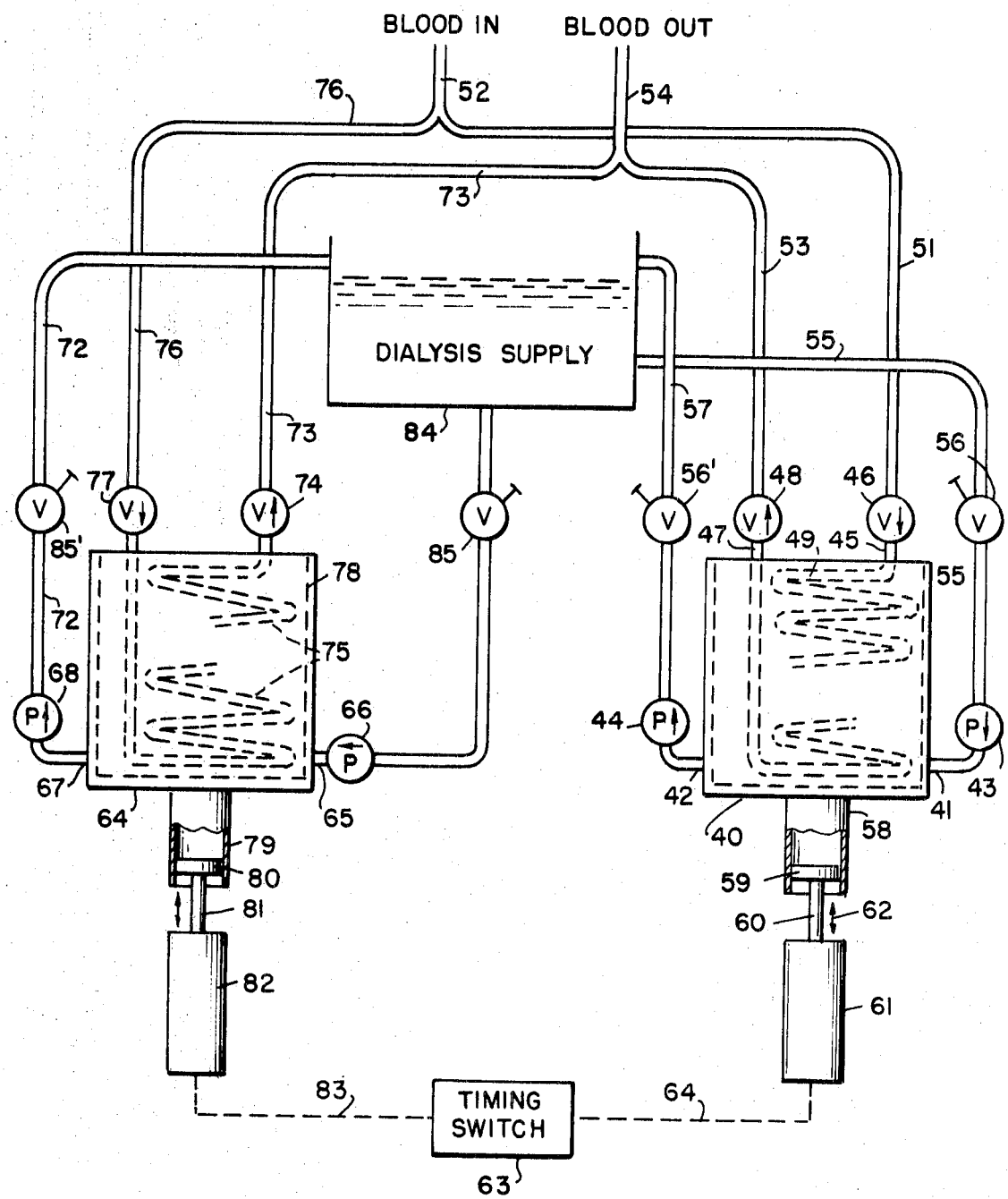

Other objectives of the present invention will be apparent from the following detailed description of the inventor's best mode of carrying the invention into effect, the description being taken in conjunction with the accompanying drawing. In the drawing:

FIG. 1 is a schematic showing of the artificial kidney of the first embodiment of the present invention, with the drums shown partly broken away; and FIG. 2 is similar to FIG. 1 and shows an alternative embodiment.

In the drawing of FIG. 1, an inlet tube 10 has an inlet port 11 connected to a hepranization unit 9. Inlet port 8 of hepranization unit 9 is adapted to be connected to the flexible tube which is permanently connected, for example, by a branching device, to an artery in the patient's wrist. Tube 10 branches into tubes 10a and 10b each of which is connected to elongated tube 12a and 12b, respectively, of a thin dialysis membrane. A suitable membrane material is pure cellophane. The membrane is porous, under diffusion, to the impurities in the blood while not passing the blood cells and other blood constituents. The membrane tubes 12a and 12b may be wound in a spiral helix about a cylinder or may be coiled in a basket having holes or otherwise coiled. The exit end of the membrane tubes 12a and 12b are connected to tubes 14a and 14b, respectively, which join to form tube 14 having an exit portion 15. Exit port 15 is adapted to be connected to a tube secured to a branching device in a vein in the patient's wrist. One-way valves 16a and 16b are positioned in tubes 10a and 10b respectively. A second pair of one-way valves 17a and 17b are positioned in the tubes 14a and 14b respectively. The direction of the one-way valves 16 and 17 is to permit blood flow only from port 8 to port 15, that is, in the normal flow position from the artery to the vein.

The membrane tubes 12a and 12b are coiled within fluid-tight drums 18a and 18b. The drums 18a and 18b each has an entry port 19a and 19b and an exit port 20a and 20b, respectively. Tubes 21a and 21b are connected between exit ports 20a and 20b to tube 20 and to a first liquid pump 22. The tubes 21a and 21b, at least in their portions 36a and 36b, are flexible so that, when squeezed close, they become constricted and restrict the flow of liquid. Liquid from the first pump 22 is pumped to the washing fluid supply 35. A second pump 23 pumps the washing fluid from supply 35. Preferably the pumps 22 and 23 are centrifugal pumps which are dynamically balanced as to each other, so that they pump the same volume of liquid at equal pressures.

The washing liquid in supply 35 is a water dialysis solution containing various chemicals compatible with the blood. For example, the solution may contain glucose, sodium, chloride and potassium chloride. The pH of the washing liquid is adjusted so that it is the same as blood. Preferably the washing fluid is warmed to blood temperature by a heating coil (not shown). Alternatively, the blood may be warmed in a separate heat exchange unit and recirculated to the patient. The liquid from pump 23 is pumped into tube 25 which branches into tubes 25a and 25b. Tube 25a is connected to the entry port 19a of the drum 18a. Similarly, tube 25b is connected to the entry port 19b of the drum 18b. The tubes 25a and 25b, at least in their portions 26a and 26b, are sufficiently flexible so that, when squeezed close, they become constricted.

A valve mechanism 27 is positioned to alternatively constrict the four tubes 21a and 21b and tubes 25a and 25b. The mechanism shown includes a slide bar 28 which oscillates back and forth horizontally. A protruding rod of bar 28 is rotatably attached to a constantly rotating motor driven wheel 29. The bar 28 squeezes the tube portions 36a and 26a again anvil 30 and subsequently squeezes tube portions 26b and 36b against anvil 31.

In operation, the entry port 8 is connected to the patient's artery. The blood passes through hepronization unit 9 and through tube 10 into the branched tubes 10a and 10b. The hepronization unit drips an anticoagulent, such as the sodium salt of heparinic acid or bis-hydroxy-coumatin into the flowing blood, to prevent clotting of the blood. The branched tubes 10a and 10b conduct the blood, which contains impurities, into the coiled membranes, respectively 12a and 12b. The blood flows through the elongated membranes and is purified by diffusion with the washing fluid within the drums 18a and 18b, respectively. The pumping action causes the blood to circulate from the coils 12a and 12b, respectively, into the branched return tubes 14a and 14b from their joined tube 14 back to the patient's vein.

The motor 24, with its driven pumps 22 and 23, serves two functions in regard to the washing dialysate liquid. First, it circulates the liquid from the bath supply 35 through the drums 18a and 18b and returns it to the bath supply 35. This circulation enables the blood containing membrane to be constantly washed by fresh dialisate liquid. Secondly, the motor and its connected pumps 22 and 23 serve to pump the blood from the tube 10 connected to the artery, circulate it through the membrane coils 12a and 12b, and return the blood under pressure to the vein by means of tube 14. The pumping action occurs by causing the washing liquid in each of the drums 18a and 18b to be alternatively placed under higher and lower pressure. That is, when the liquid in drum 18a is under a raised pressure, the liquid in drum 18b is under a reduced pressure. The raised pressure on the washing liquid in drum 18a causes contraction of the membrane and a pumping of the blood within the membrane through the exit tube 14a. At the same time, the reduced pressure on the washing liquid within drum 18b is causing an expansion of the membrane tube 12b and drawing the blood through the one-way valve 16b, and its connected tube 10, from the patient's artery. Subsequently, the pressure is raised on the washing fluid within drum 18b and simultaneously the pressure of the washing fluid within drum 18a is reduced. At that subsequent time the blood within membrane 12b will be forced through the one-way valve 17b and out through its connected tube 14b to the patient's vein. Simultaneously, the blood will be drawn from the pateint's artery to tube 18a and the one-way valve 16a into the membrane coil 12a.

This alternative (push and pull) action is caused by alternatively contracting and permitting the expansion of the flexible portions of tubes 25a, 25b, 21a and 21b. The flexible portions 26a and 26b of the tubes 25a and 21b, are simultaneously squeezed by the valve unit 27. At that moment when they are squeezed, however, the tubes 21a and 25b are open and do not present a restricted orifice to the pumps 22 and 23. Alternatively, the motor unit squeezes partially, or almost fully, closed the flexible portions 26b and 36b of the tubes 25b and 21a respectively. When those flexible portions are squeezed, thereby narrowing the orifice and presenting a greater resistance to the pumps 22 and 23 through the tubes 25b and 21a, the tubes 21b and 25a are open and present a low resistance to those pumps. This alternating rise in the resistance due to the closing of the orifice and subsequent lowering in the resistance due to the opening of the orifice presents a pressure difference in regard to the fluid within the drums 18a and 18b, respectively. For example, the pump 23a pumps dialysate liquid from the supply bath 35 through the tube 25. The dialysate liquid in bath 35 is periodically replaced with fresh solution. However, when the flexible portion 26b is constricted, there will be only a slight flow of dialysate liquid through the tube 25b. At that same time, the tube 21b is open as its flexible portion 36a is not being squeezed. The pump 22 will draw the fluid from the drum 18b and pump it into the dialysate bath 35. This will have the effect of lowering the pressure of the fluid within the drum 18b. The drums 18a and 18b will continually be full of washing liquid. It is, however, the pressure on that liquid which is changed by means of the valve unit 27.

Other embodiments are within the scope of the present invention, for example, the drums 18a and 18b, may be replaced by the sandwich type of membrane device. In the sandwich type of membrane device, flat sheets of membrane are placed in a frame. The blood circulates between the membranes and the washing fluid is circulated on the outside of the membranes. This type of sandwich construction may be utilized in the hydraulic type of pump of the present invention. When the one sandwich unit is being pumped out, that is, the blood between the membranes is under pressure, the blood in the opposite sandwich unit may be pumped in, that is, the blood would flow in under the reduced pressure on the membranes. Pressure on the membrane would be as in the previously described embodiment, alternatively raised and lowered by a valve unit constricting and opening four tubes.

As still another embodiment, the motor 24 and the pumps 22 and 23 and valve unit 27 may be replaced by individual pressure pumps. For example, four individual pumps may be used, each pump being connected to the individual lines 25a, 26b, 21a and 21b. The speed control of the pumps may be electrically controlled by conventional speed control mechanisms such as voltage regulators operated by a timing motor.

In the embodiment of FIG. 2, the fluidtight drum 40 has an entry port 41 and an exit port 42 for the dialysis liquid, each port having a one-way pump, the pumps being respectively 43 and 44. The drum also has an inlet port 45, with a one-way valve 46, and an outlet port 47 with a one-way valve 48. The directions of the arrows indicate the way the valves open, i.e., the direction of flow of the liquid. A tubular membrane 49 is coiled within the top part of the drum 40, for example, by being held in a perforated basket 50. The tubular membrane 49 is connected between the ports 45 and 47. The port 45 is connected to line 51, which is a branch of line 52. Line 52 is adapted to be connected to the patient's artery. The outlet port 47 is connected to line 53 which is a branch of line 54. The line 54 is adapted to be connected to the patient's vein.

A dialysis washing fluid inlet tube 55 is connected between port 41 and the dialysis supply 84. The inlet tube 55 has an adjustable constricted valve 56 which controls the rate of flow of dialysis washing liquid. A second tube 57 is connected between the outlet port 42 and the supply 84, the second tube 57 carrying dialysis fluid which has flowed over the tubular membrane.

The drum 40 has a cylinder portion 58 or the drum may be connected by a cylinder by a hydraulic line. The cylinder 58 has within it a piston 59 which is connected to shaft 60. Shaft 60 is the output shaft of an air pressure cylinder 61. The movement of the shaft 60 is in the direction shown by arrows 62 and under the control of the timing switch 63 which is connected to the air pressure device 61 by line 64. Alternatively, other types of reciprocal acting controlled pressure means may be used, such as hydraulic fluid mechanisms or solenoid mechanisms.

The second drum 64 is similar to the first drum 40. It also has an inlet port 65, having a one-way pump 66, and an outlet port 67, having a one-way pump 68. The inlet port 65 is connected by tube 67 to the dialysis supply 84. The outlet port 67 is connected by tube 72 to the inlet of the dialysis liquid supply 84. A tube 73 having a one-way valve 74 is connected between the tubular membrane 75 within the second drum 64 and the tube 54. A tube 76 having a one-way valve 77 is connected between the tubular membrane 75 within the second drum 64 and the tube 54. A tube 76 having a one-way valve 77 is connected between the other end of the membrane 75 and the tube 52. The membrane is held within a perforated basket 78.

In operation, the tube 52 is connected to the patient's artery. Blood is withdrawn through tube 52 into the membrane 49. It is then pumped from the membrane 49 out through the tube 53 and into the tube 54 and then into the patient's vein. While the blood is being pumped out of membrane 49 it is being pumped into the membrane 75 so that there is a constant flow of blood. The pumping action is accomplished by the cylinders 82 and 61. One cylinder is applying increased pressure on the washing fluid within the drum 40, while simultaneously the other cylinder is applying decreased pressure to the washing fluid within the drum 64. The rising and falling of the pressure of the washing fluid within the drum does not affect the pumping of the washing fluid from the dialysis supply 84 through the first one-way valve into the drum. The pumps 66,68 and 43,44 are constant volume pumps, such as piston pumps or diaphragm pumps. The air pressure mechanisms 61 and 82 serve to pump the blood. The increased pressure of the dialysis fluid acting on the membrane will pump the blood out of the membrane. The decreased pressure of the washing fluid on the membrane will cause the blood to flow. Adjustable restrictive valves 56 and 56' and their corresponding valves 77 and 77' are positioned in the lines carrying dialysis fluid. The valves 56 and 77 are in the inlet lines of the dialysis fluid, respectively, lines 55 and 67. The restrictive valves 56' and 77' are in the outlet lines for the dialysis fluid, which are respectively lines 57 and 72.

In accordance with the present invention, the dialysis device may be one-half of the system shown in FIG. 1 or one-half of the system shown in FIG. 2, for example, for use in a withdrawal type of dialysis system, a small area of an artery and vein are joined together, forming a small direct line of flow. A single needle is positioned in that flow line and a fixed amount of blood, for example, 300 c.c., withdrawn from the body. That fixed amount of blood is then cleaned in a dialysis device. In both systems, constituting one-half of the system shown in FIG. 1 or FIG. 2, the blood is first drawn into the tubular membrane by means of the decreased pressure of the dialysis liquid. Subsequently, the pressure of the dialysis liquid is raised and the blood is pumped out of the membrane. The pumping action may occur either by means of a centrifugal pump, as shown in FIG. 1, or by means of a piston or cylinder, as shown in FIG. 2.

In addition, the withdrawal type of system may use a flat membrane. The only change would be that the tubular cleaning membrane, as shown in FIGS. 1 and 2, would be replaced by the flat membrane. However, the increased and decreased pressure on the membrane brought about by increasing and decreasing the pressure of the washing liquid would be the same.

The supply of dialysis can be from a return supply, as illustrated, or from a flow or water which is continually mixed with a dialysate concentrate and then discarded.

I claim:

1. An artificial kidney comprising:

an inlet tube adapted to be connected to a patient's artery and having a one-way valve permitting flow away from the artery only, and an outlet tube adapted to be connected to the patient's vein and having a second one-way valve permitting flow into the vein only;

a dialysis membrane container having inlet and outlet ports, the inlet port being connected to said inlet tube and the outlet port being connected with said outlet tube, the said membrane container being of a thin flexible material which is permeable to blood impurities and impermeable to blood cells;

a fluidtight container containing said membrane and having ports for the membrane and also inlet and outlet ports for the flow of washing liquid;

a supply of washing liquid connected by a supply tube and a return tube to said inlet and outlet ports, respectively, of said container;

means to raise and subsequently lower the pressure of said washing liquid within said container; and means to control said pressure means to alternately raise and lower said pressure at predetermined times.

2. An artificial kidney as in claim 1 wherein said membrane is an elongated tube which is coiled, and the container is a drum.

3. An artificial kidney as in claim 1 wherein said pressure means includes two liquid pumps, one pump being in said washing liquid supply line and the second pump being in said washing fluid return line.

4. An artificial kidney as in claim 1 and further including a second inlet tube connected to the first inlet tube, said second inlet tube having a one-way valve, a second outlet tube connected to the first outlet tube having a one-way valve, a second dialysis membrane having inlet and outlet ports, the inlet port being connected to the said second inlet tube and the outlet port being connected to the said second outlet tube, the membrane being of a thin flexible material, a fluidtight container containing said second membrane and having ports for the second membrane and also inlet and outlet ports for the washing fluid supply tube, and a return tube connected to said inlet and outlet ports of said container to said supply container, means to pump said washing fluid from and to said second container, and means to raise and subsequently lower the pressure of said washing liquid within said second container, and means to control said pressure means to alternatively lower and raise said pressure at predetermined times which times alternate in cycle with the raising and lowering of the pressure in the first fluidtight container.

5. An artificial kidney as in claim 1 wherein the means to raise and subsequently lower the pressure of said washing fluid within said container consists of a piston operating within a cylinder, the said cylinder containing a portion of the said washing liquid and being in communication with the washing liquid within the said container.

6. An artificial kidney as in claim 5 wherein the supply tube and return tube each have therein a one-way valve and at least one of the tubes has an adjustable restrictive valve.

7. An artificial kidney as in claim 1 and also including a pump in series with the supply tube and return tube to pump liquid from said supply container to and from said fluidtight container.